Patented Oct. 30, 1923.                                                          1,472,287

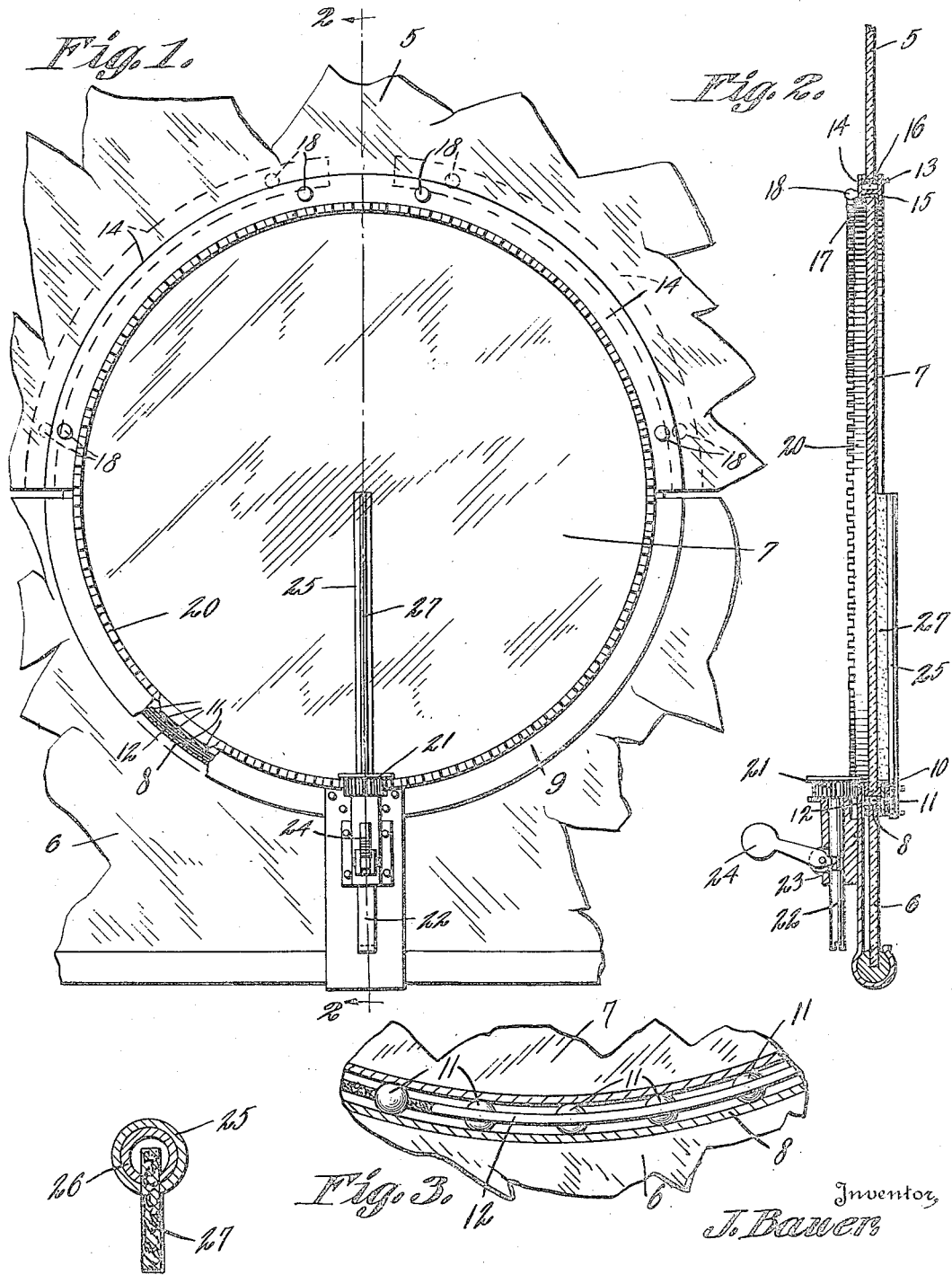

UNITED STATES PATENT OFFICE.

JOHN BAUER, OF DETROIT, MICHIGAN.

STORM SHIELD.

Application filed September 30, 1921. Serial No. 504,358.

*To all whom it may concern:*

Be it known that I, JOHN BAUER, a citizen of the United States, residing at Detroit, in the county of Wayne and State of Michigan, have invented a new and useful Storm Shield, of which the following is a specification.

This invention relates to motor vehicle wind shields, and wind shield cleaning devices, the primary object of the invention being to provide novel means for cleaning a window or wind shield to insure a clear line of vision therethrough.

Another object of the invention is to provide a wind shield having a movable section and a stationary wiper, means being provided for rotating the movable section to remove foreign matter therefrom.

A still further object of the invention is to provide means for reducing friction between the movable sections of the wind shield and the stationary portions thereof.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 is a fragmental elevational view of a wind shield and wiper constructed in accordance with the present invention.

Figure 2 is a sectional view taken on line 2—2 of Figure 1.

Figure 3 is a fragmental detail view disclosing the connection between the movable section of the shield and the stationary sections thereof.

Figure 4 is a transverse sectional view through the wiper forming a part of the invention.

Referring to the drawings in detail, the device is shown for use on a motor vehicle, wind shield, and includes an upper section 5' and a lower section 6 formed of transparent material, the same having semi-circular cut out portions adapted to register when the sections are brought together or in a closed position, to provide an opening to accommodate the circular movable section 7.

A stationary retaining member indicated at 8 is formed with opposed flanges 9 adapted to closely engage opposite surfaces of the lower section 6 at a point adjacent to the curved wall formed by the semi-circular cut out portion of the section. This retaining member is also formed with upwardly extending flanges indicated at 10 between which flanges are disposed the ball bearings 11 that are positioned in suitable openings formed in the felt ring 12, it being contemplated to saturate the felt ring 12 with a suitable lubricating medium, in order that the balls 11 will roll freely between the flanges 8 and 10. A semi-circular retainer 13 cooperates with the curved wall of the upper section 5, as clearly shown by Figure 2 of the drawings, and this retainer embodies upwardly extending spaced flanges 14 and downwardly extending spaced flanges 15, the lower or downwardly extending spaced flanges 15 embracing the upper curved edge of the curved section 7.

In order that the curved section 7 will not obstruct the movement of the upper section 5 if desired to open the same, a space 16 is provided between the wall of the curved cut out portion of the section 5 and the web 17 which connects the opposed flanges 15, knobs 18 being provided to permit the movable retaining member to be moved upwardly out of contact with the circular movable section 7 of the windshield. This movable retaining member 13 is formed in sections, and may be removed when the upper section 5 of the wind shield is moved to an open position.

Secured to the circular movable section 7 is a ring gear 20 which extends laterally therefrom and cooperates with the pinion 21, carried at one end of the shaft 22 which may be operated by any suitable means not shown. Formed intermediate the ends of the shaft 22 is a cut out portion 23 adapted to receive one end of the arm 24 which may be moved vertically to cause the pinion 21 to be moved into and out of engagement with the teeth of the ring gear 20.

The wiper which forms an element of the invention embodies a tubular member 25 and an inner tubular member 26, each of the tubular members being provided with registering cut out portions to grip the wiper proper 27, which may be in the form of felt or other suitable material. This wiping element contacts with the movable section 7 and is held stationary so that when the movable section 7 is rotated, under the wiping element, foreign matter will be removed therefrom.

From the foregoing it will be seen that I have departed from the usual wind shield wiping construction and provided a movable section adapted to be moved over a wiper, to the end that a clean section of the movable portion of the wind shield may be moved to intersect the line of vision of the operator positioned at the rear of the wind shield.

Having thus described the invention, what is claimed as new is:—

In combination with the adjacent sections of a windshield having semi-circular cut out portions in the glass thereof, a circular retaining member fitted into the cut out portion of the glass and secured thereto, the inner wall of said retaining members being channelled to provide a race-way, a circular transparent disk provided with a band about its periphery and fitted between the race-way of the retaining member, and the band surrounding the transparent disk, a ring gear carried by the band, a pinion in mesh with the ring gear for rotating the ring gear and transparent member supported thereby, and a stationary wiper at the lower portion of the circular transparent member to remove foreign matter therefrom, and means for locking the pinion against movement.

In testimony that I claim the foregoing as my own, I have hereto affixed my signature in the presence of two witnesses.

JOHN BAUER.

Witnesses:
CLYDE G. DE WITT,
DAVID W. DE WITT.